United States Patent [19]

Porter et al.

[11] Patent Number: 5,399,419
[45] Date of Patent: Mar. 21, 1995

[54] REINFORCED FILM AND METHOD OF MANUFACTURING SAME

[75] Inventors: John F. Porter, St. Catharines; D. Mark Woiceshyn, Jordon, both of Canada

[73] Assignee: Bay Mills Limited, St. Catharines, Canada

[21] Appl. No.: 916,683

[22] Filed: Jul. 22, 1992

Related U.S. Application Data

[60] Continuation-in-part of Ser. No. 735,643, Jul. 25, 1991, abandoned, which is a division of Ser. No. 403,872, Sep. 7, 1989, Pat. No. 5,057,172.

[51] Int. Cl.⁶ .................. B32B 5/26; B32B 31/20; B32B 33/00
[52] U.S. Cl. .................. 428/236; 156/176; 156/324; 427/366; 428/247; 428/340
[58] Field of Search ............. 156/176, 324; 427/366; 428/236, 247, 340

[56] References Cited

U.S. PATENT DOCUMENTS

| | | | |
|---|---|---|---|
| 2,577,205 | 12/1951 | Meyer et al. | 428/236 |
| 2,682,484 | 6/1954 | Thomas . | |
| 2,706,699 | 4/1955 | Plansoen et al. . | |
| 3,149,019 | 9/1964 | Skotnicki et al. . | |
| 3,152,949 | 10/1964 | Guthrie . | |
| 3,250,662 | 5/1966 | Seaman . | |
| 3,516,883 | 6/1970 | Harper | 156/77 |
| 4,010,306 | 3/1977 | Fagan | 428/236 |
| 4,064,306 | 12/1977 | Scotchmer et al. | 428/255 |
| 4,188,445 | 2/1980 | Hill | 428/246 |
| 4,368,228 | 1/1983 | Gorgati | 428/110 |
| 4,397,909 | 9/1983 | Goddard et al. | 428/252 |
| 4,491,617 | 1/1985 | O'Connor et al. | 428/236 |
| 4,539,254 | 9/1985 | O'Connor et al. | 428/236 |
| 4,609,423 | 9/1986 | Zufang et al. | 156/555 |
| 4,615,934 | 10/1986 | Ellison | 428/254 |
| 4,645,554 | 2/1987 | Wyser | 156/159 |
| 4,666,761 | 5/1987 | Stamper et al. | 428/283 |
| 4,762,744 | 8/1988 | Woiceshyn et al. | 428/219 |
| 4,810,315 | 3/1989 | Zufang et al. | 156/84 |
| 5,057,172 | 10/1991 | Woiceshyn | 156/583.1 |

FOREIGN PATENT DOCUMENTS 0003718 8/1979 European Pat. Off. .
2055057 2/1981 United Kingdom .

OTHER PUBLICATIONS

Lee, "Trends in Fabric Lamination", Industrial Fabric Products Review, Oct., 1985, pp. 1 through 4.

*Primary Examiner*—James C. Cannon
*Attorney, Agent, or Firm*—Fitzpatrick, Cella, Harper & Scinto

[57] ABSTRACT

A reinforced, impervious, unitary film and a method for making the same are disclosed. In a preferred embodiment, a film is produced from a layer of weft inserted warp knit scrim and at least one layer of lightweight, porous mat, together being impregnated with a suitable thermoformable plastic in liquid form such as PVC plastisol, then being set and calendered under pressure to deform the plastic and create a continuous, non-porous, unitary film. The resulting product is highly resistant to water absorption and hydrostatic pressure and essentially non-wicking.

43 Claims, 1 Drawing Sheet

REINFORCED FILM AND METHOD OF MANUFACTURING SAME

This application is a continuation-in-part of copending application, Ser. No. 07/735,643, filed Jul. 7, 1991, now abandoned, which application is a divisional of prior application, Ser. No. 07/403,872, filed Sep. 7, 1989, now U. S. Pat. No. 5,057,172.

BACKGROUND OF THE INVENTION

1. Field of the Invention

The present invention relates to reinforced films impervious to rain or other liquids or gases and useful for tarpaulins, boat and truck covers, lawn furniture, awnings, tenting, signs and the like. The films of this invention can attain significantly improved properties in terms of resistance to hydrostatic pressure, reduced water absorption and essentially no wicking of moisture. The present invention also relates to the manufacture of such films. In a preferred embodiment, the film includes a polyester open fabric and at least one lightweight, porous mat embedded within cured polyvinylchloride (PVC).

2. Description of the Related Art

Impervious, reinforced industrial membranes may consist of a reinforcing fabric sandwiched between two films of plastic. The fabric principally supplies strength, and the films make the membrane non-porous and impervious.

Higher tensile strength contributes to higher tear strength and puncture resistance. Good tear or breaking strength is necessary to prevent exacerbation of an accidental puncture. Other key criteria are resistance to hydrostatic pressure and low wicking by the fabric.

In the past, primarily two kinds of fabric were available for the impervious, reinforced industrial membrane industry. They were open, loose scrim (woven and non-woven) and very tightly woven, conventional, plain weave fabric.

The open scrim permitted very high adhesion between two films laminated on each side of the fabric because each film readily bonded to the other through the openings of the scrim. Because of this high degree of adhesion between the films, little or no adhesion was required between the film and the yarn of the fabric. The yarns could slide through the membrane very easily to "rope up" and provide a relatively high tear strength. However, because of the few or small number of yarns used to achieve the openness of the weave, the tensile strength was low. Moreover, due to the nature of the open scrim, it was difficult to use liquid coating processes to create two films on either side of these fabrics. Instead, membranes were made by laminating a scrim between two previously prepared films. For example, in making prior art membranes using open weave scrim fabrics, two PVC films were first created by extrusion, cured and then laminated to each side of a polyester scrim, perhaps with an adhesive between them. Such a lamination technique did not create a single, unitary film, and if not completely successful, resulted in a membrane that delaminated easily when stressed. Further, if any bit of delamination occurred, the yarns of the fabric tended to wick moisture into the membrane. Wicking (allowing moisture to seep into and along the yarns at the edges, cracks or openings) exacerbates the problem of delamination. Wicking can also cause discoloration resulting from mold or mildew. This is a problem aesthetically.

An alternative prior art method for making a non-porous membrane using an open-weave fabric is the rotary screen method. In this method, a thick paste of very viscous thermoplastic polymer, having for example a viscosity on the order of 50,000 centipoise ("cps"), is placed inside a rotating cylinder made of a screen. A press or scraper extrudes the paste out of the cylinder where it is transferred to a fabric. If two such rotating cylinders are placed on each side of an open weave fabric, a film can be formed on both sides of it. However, the equipment for this process is expensive and the adhesion of the film to the fabric is not at a maximum because the thick paste does not fully impregnate the yarns of the fabric.

Tightly woven conventional weaves of fabric were also used in impervious, reinforced industrial membranes in the past for high tensile applications. Because there were essentially no openings in these fabrics, liquid coating processes could be used with them to create films on each side of the fabric. Because of the tight weave, however, it was impossible to create a single unitary film, and there was no adhesion of the film on one side to the film on the other. Strength therefore depended on the adhesion of the film to the yarn. This film-to-yarn adhesion, along with the tight weave, would tend to lock the yarns in place and keep them from sliding, significantly reducing the tear strength of the fabric. That is, the yarns were not able to work together (i.e., "rope-up") to resist the tearing force, but were torn individually.

Some attempts to manufacture an improved fabric have addressed the fabric weave. For instance, U.S. Pat. No. 3,250,662 relates to a modified weave design that was developed in the early 1960s. This fabric utilizes a warp having yarns of two different denier sizes arranged so that two of the smaller denier yarns alternated with the single yarns of the larger denier.

In a further weave design, the fill yarns were laid only on one side of the warp yarn rather than having them interlock between the warp yarn. Because of the nature of the equipment utilized in the late 1960's to provide the new weave design, the fill yarn was inserted in an overlapping crisscross pattern at a five-degree bias angle to the warp yarn.

In another prior art fabric weave design, the fill yarns were inserted parallel to each other and perpendicular to the machine direction yarns and then knitted together. This construction came to be known in the industry as weft inserted warp knit (WIWK) fabric. This arrangement gave better tear strength and economics, but can be further improved by use of the present invention.

Accordingly, it is one object of the present invention to manufacture a non-porous, reinforced film, impervious to liquids or gases, that has the nature of a unitary film and is less susceptible to delamination and otherwise has improved properties.

It is another objection of the present invention to provide an impervious, reinforced, unitary film including an open fabric, sometimes referred to as a grid, web or scrim, provided with at least one light-weight, porous mat and impregnated with plastic. The resulting film has a high resistance to hydrostatic pressure and is resistant to water absorption, i.e., is "low-wicking". Preferably, it is essentially non-wicking.

It is still another object of the instant invention to provide a process and apparatus whereby the abovedescribed film may be made using an uncomplicated arrangement of machinery.

These and other objects that will become apparent and may be better understood by the detailed description provided below.

SUMMARY OF THE PRESENT INVENTION

The present invention is directed to a non-porous, impervious, unitary, reinforced film. The film includes an open fabric positioned adjacent at least one lightweight porous mat. A viscous liquid comprising a thermoformable plastic is coated onto and impregnated into the fabric and mat combination. The liquid may for example comprise a carrier liquid in which the plastic is emulsified, dispersed, dissolved or otherwise liquified or suspended. The liquid flows through the open fabric and the porous mat; the liquid impregnates yarns of the fabric and surrounds filaments of the mat. The plastic is then set in situ on the fabric and mat, for example by a partial curing, by drying, or otherwise greatly increasing its viscosity and reducing or eliminating any tackiness. The impregnated fabric and mat combination is then subjected continuously to heat and pressure by calendering, which forces the plastic (a) to further impregnate and surround fibers of the yarn and filaments of the mat, (b) to close up pores and voids in the combination of fabric and mat impregnated with plastic to create a unitary, continuous, non-porous film, (c) to embed the fabric/mat combination in the film and (d) to thoroughly fuse the plastic coating to obtain a strong continuous film. The plastic thus penetrates through the open fabric and porous mat and adheres to the yarns of the fabric and the filaments of the mat. Preferably the resultant product of this invention is an homogeneous, unitary film of plastic, the reinforcement is fully embedded therein, and the surface of the film is not pierced by the fabric or the mat and has no other discontinuities.

The present invention is also directed to the method of manufacturing the impervious film. The film is manufactured in a continuous process in which a viscous liquid (for example, an emulsion, dispersion, solution or other suspension), comprising a thermoformable plastic, is coated onto and impregnated into an open fabric and at least one lightweight, porous mat. A wet lamination process may also be used. The impregnated fabric and impregnated mat or mats are in side-by-side relation and form a combination that carries the viscous liquid. The viscous liquid is set in situ to form an intermediate combination of impregnated fabric and mat that still may contain pores. This intermediate impregnated combination is then subjected continuously to sufficient heat and pressure in a calendering operation to deform the plastic, force it further into the yarn and mat or mats, close pores and voids, and bring plastic on each side of the combination into adhesive contact with plastic on the other through openings in the fabric and pores in the mat. Such plastics, mats, and steps are selected and performed so as to create an impervious, low-wicking, reinforced, continuous, unitary film.

In the process of the present invention, the continuous nature of the calendering results in the plastic impregnating and embedding the fabric and mat(s) in a continuous, unitary film, and the resultant film is essentially non-porous and free from internal voids.

A better understanding of these and other advantages of the present invention, as well as objects attained for its use, may be had by reference to the drawings which form a further part hereto and to the accompanying descriptive matter in which there are illustrated and described preferred embodiments of the invention.

DETAILED DESCRIPTION OF THE INVENTION

Figure 1:
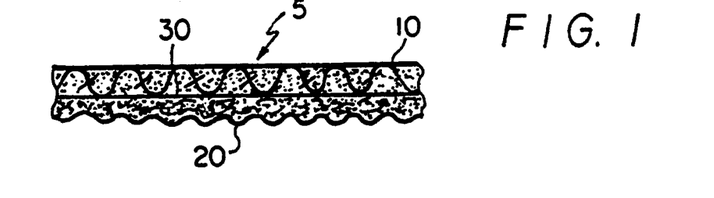
FIG. 1 is a cross-sectional view of an impervious, unitary film according to one embodiment of the present invention.

Referring now to FIG. 1, the impervious, reinforced, unitary film 5 according to one embodiment of the invention is illustrated. The film 5 includes an open fabric 10 and a porous mat 20. The open fabric 10 is preferably a weft inserted warp knit (WIWK) polyethylene terephthalate (PET) scrim. Other materials may be used such as polyester, polyamide, aromatic amide, polyolefin, glass, fiberglass, and rayon. Thus, organic or inorganic materials may be used. Also, other fabrics, such as those made by a woven or non-woven process, may be used. The open fabric 10 may have four to twenty yarns per inch in either the machine direction or the cross machine direction. However, it is preferred to have six to nine yarns per inch in the machine direction and six to eighteen yarns per inch in the cross machine direction. It may have a weight of one to eight ounces per square yard, but preferably is three to 4.2 ounces per square yard.

The mat 20 is generally a single layer of randomly oriented continuous or staple filaments preferably, of polyester or paper. The mat 20 may be a spunbonded polyester sheet weighing on the order of 0.2 to 1.5 ounces per square yard, with 0.4 to 0.7 ounces per square yard preferred. A typical material to be used is the polyester mat known under the trademark Reemay. Other materials that may be used for the mat 20 are polyamide, polyolefin, glass, fiberglass, rayon, and other fabrics suitable for use in the instant invention. Thus, organic or inorganic materials may be used.

We have discovered that organic materials such as paper, tissue paper, cellulose and the like also may be used for the mat 20. These materials may be used alone or in combination with the materials discussed above. Thus, the mat 20 may include at least one material selected from the group consisting of paper, tissue paper, cellulose fibers, polyamide, polyolefin, glass, fiberglass, rayon and polyester. For example, combinations of polyester and cellulose or polyethylene and cellulose are contemplated in this invention. Other lightweight, porous organic or inorganic materials may be used as desired. Therefore, the present invention is not limited to these examples.

Mats of the organic materials have weights in the range of seven to twenty pounds per three thousand square feet (ream), which is equivalent to 0.34 to 0.96 ounces per square yard, respectively, preferably ten to fourteen pounds per three thousand square feet (ream), which is equivalent to 0.48 to 0.67 ounces per square yard, respectively, and a porosity of two to four hundred cubic feet per minute (cfm), preferably ten to 200 cfm. If paper is used as the mat 20, the cellulose fibers of the paper are the filaments that make up the mat.

The advantages of using paper based materials for the mat are that paper is a much more homogeneous mixture of filaments and resin than traditional products used in such a process. Further, because each filament and fiber is coated later in processing, substantially reduced wicking results. In fact, paper is preferred because it is more effective in filling voids than other materials, but it is porous enough to allow the binder coating to flow through. In addition, paper is 75 to 80% cheaper than other non woven materials. Other advantages are that paper, and tissue paper in particular, conform without wrinkling.

The mat 20 bridges the gap between the yarns of the fabric 10 and holds enough applied thermoformable plastic 30 such that after calendering, the coating is forced through the mat and the yarns of the fabric with no pinholes remaining in the final product.

The fabric 10 and the mat 20 are coated with a suitable thermoformable plastic coating 30. Preferred materials for coating 30 are polyvinylchlorides such as PVC plastisol and PVC latex, having melting temperatures ranging from 275° F. to 425° F. Other polymeric materials that may be used include but are not limited to polychloroprene, polyurethane, polyethylene, and acrylics, acetate-latex, and chlorosulfonated polyethylene.

The resulting film 5 is one having all interstices filled, the surfaces of which are smooth and in which no voids or air bubbles exist. The resulting film 5 is water impervious, strong, non-porous and has the features of having a high resistance to hydrostatic pressure and being resistant to water absorption, i.e. it is "low-wicking". Hydrostatic resistance above 200 psi is preferred as measured by ASTM test no. D-3393. A material of this type lends itself particularly well to use as a waterproofing membrane for tarpaulins, boat and truck covers, lawn furniture, awnings, and the like.

Wicking may be tested by cutting an edge of a reinforced film or membrane, holding the cut edge in contact with the surface of a testing liquid, such as water containing a dye, for a short period of time, withdrawing the fabric edge from the liquid, and observing how far the liquid has been drawn by capillary action along the yarn up into the film or membrane. While industrial membranes of the prior art will draw the testing liquid up into the membrane as much as an inch, films of this invention are essentially non-wicking; that is, they draw essentially no liquid into the film when tested as described.

A liquid absorption test may also be performed in which a sample sheet of fabric of specified size is soaked in a test liquid for a set period. The sheet is then removed and the amount of liquid adsorbed, if any, is measured accordingly. The films of this invention give improved performance relative to the prior art in this test as well.

In addition to the creation of a film comprising an open fabric and at least one mat, additional fabrics or mats may be included in or adjacent to the film.

Figure 2:
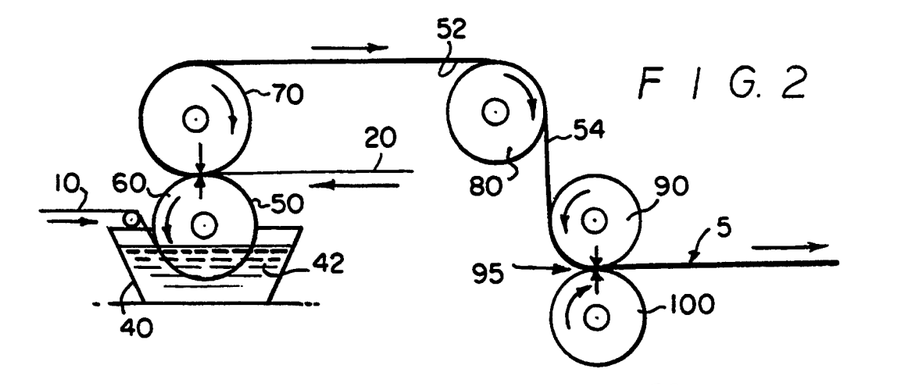
FIG. 2 is an embodiment of apparatus for use in applying the manufacturing method of this invention.

FIG. 2 illustrates an embodiment of an apparatus for performing a method of manufacture according to the present invention. The apparatus includes a feed roller 60 for feeding the WIWK fabric 10 through a liquid viscous bath 42. The kind of roller used will depend on the type of material used. For instance, steel or rubber or other suitable materials may be used.

The liquid bath 42, held in container 40, is generally a low viscosity mix. Although viscosities on the order of 50 to 10,000 centipoise (cps) may be used, it is preferred to use coatings having on the order to 1000 to 4000 cps, with 2000 to 3000 cps being the most preferred. The plastic in the liquid should be thermoformable so that it may be calendered at a later stage.

Container 40 is larger than roller 60 so that any excess liquid will drain back to the liquid bath 42. A preferred liquid level of the bath is such that a depth on the order of two to three inches may be maintained. Although the coating step has been depicted as a dipping stage, other conventional coating techniques may be applied including, but not limited to, brushing or spraying so that an adequate coat is applied.

The liquid bath preferably contains approximately 85% solids to liquids (e.g., organosol to plastisol). Additives may be introduced as necessary to obtain desired properties in the resulting film such as translucency, opacity, flame retardance, and flexibility. Also, surfactants or wetting agents, such as Union Carbide silicone surfactant Sag 47 may be added as required, depending for example on the fabric and mat being used and on the viscosity of the liquid.

The mat 20 is added onto the resulting coated WIWK fabric 50. Mat 20 and the coated fabric 50 are fed onto the padder roller 70 adjacent to the feed roller 60.

The padder roller 70 provides a sufficiently narrow nip with roller 60 to distribute the liquid uniformly over and into the fabric and mat combination. The viscosity of the liquid and the size of the gap between rolls 60 and 70 are adjusted such that a large amount of thermoformable plastic is picked up. We prefer that the dry weight percent of plastic picked up (that is, weight of plastic less solvents or other volatiles in the coating liquid 42, or "DPU") be 100 to 800% relative to the weight of the fabric/mat combination. It is preferred that the DPU weight of the thermoformable plastic carried on the combination be 100 to 500%, with 120 to 280% being more preferred and 170 to 220% being the most preferred.

Although it is shown that the mat 20 is fed onto coated fabric 50 after the liquid bath 42, it is within the concepts of the instant invention that equivalent methods, such as having the mat 20 fed along with the fabric 10 into the liquid coating bath 42 at the initial stages of the process, or having the mat 20 led into the bath 42 to be later combined with the fabric 10, may be used.

The open fabric and mat combination 52, now impregnated, is fed to a setting stage 80. As used herein, setting may refer to drying, partially curing the plastic as by the application of heat, or otherwise greatly increasing the viscosity and reducing or eliminating any tackiness of the liquid comprising plastic. The fabric at the setting stage may be heated to a temperature on the order of about 290° F. The setting stage 80 may include ovens or heated rollers or cans. After this stage, little or nothing remains in the impregnated combination of fabric and mat of any carrier liquid used in liquid 42, and the intermediate combination is still somewhat porous. Prior art polyester open fabrics without a mat at this stage would have air permeability incides of over 1000 (cubic feet) (seconds) per square foot. Although the inventive fabric using a mat may have an air permeability index of 0 to 5000 at this stage, it is preferred that the fabric 54 have an air permeability index of 0 to 400 with approximately 10 to 150 being the most preferred.

The intermediate combination 54 is then fed to a calendering stage 95. The calendering stage 95 includes nip rollers 90 and 100. Calendering is typically done at an elevated temperature. In a preferred embodiment, roller 100 is a hot roller with the mat 20 contacting the roller 100, as explained below. Roller 100 may be heated on the order of 250° to 450° F., but the exact temperature depends on the plastic used and the speed of the process. It is preferred to apply a temperature of about 380° to 410° F. The roller 90 may be rubber coated.

It is preferred to place the mat against the hot roller 100 at the nip because it is believed the plastic tends to flow toward heat. By so arranging the mat and the hot roller, the plastic closes up any pores and encloses the filaments of the mat, reducing or eliminating discontinuities at the exterior surface and creating a continuous surface for the film. Any tendency of the mat to break through the surface of the film is thus reduced by the tendency of the plastic to move toward the heat, and the mat therefore tends to be embedded within the film.

Because of the pressure gradient at the nip, the calendering stage 95 has significant effects. It flattens out the yarns. It has a tendency to drive the plastic between the filaments of the yarn and the mat. It causes the coating to spread out uniformly to create a unitary film that is impervious and free of voids. It also forces the plastic on either side of the fabric and mat combination through openings in the fabric and pores in the mat into adhesive contact with plastic on the other side.

The calendering stage 95 also causes the thermoplastic coating to flow and close all "windows" that may have existed in the combination 54 and promotes adhesion of the fabric 10 to the mat 20. The applied pressure using rollers about 30 inches in diameter may be about 50 to 300 pounds per linear inch. It is preferred to apply a pressure of about 150 to 200 pounds per linear inch.

At this stage, the mat 20 serves the further function of cushioning the fabric 10. This cushioning allows a higher pressure to be maintained at the calendering stage 95 and promotes and enables the calendering to have the desired effects. Moreover, any voids or openings are also closed. The higher pressure results in a non-porous, unitary reinforced film 5 having all "windows" and all pores within those windows filled in.

In a preferred embodiment of the present invention, the fabric or scrim and the mat receive a viscous polyvinylchloride in liquid form. The mat holds the polyvinylchloride in the spaces between the yarns of the scrim. The impregnated combination is first set or dried and then led to a nip (calendered) to create a cured, reinforced polyvinylchloride film from the impregnated and coated scrim and mat combination. The resulting film is the water impervious, reinforced, unitary film of the instant invention.

While the open fabric and the mat may be laminated together before they are impregnated (for example, with heat and pressure), preferably they are not so laminated, but rather are led separately into contact with the thermoformable plastic comprising viscous liquid. Preferably, only thereafter is the liquid set to laminate the fabric and the mat together. This wet impregnation process before lamination of the mat and fabric as by heat is believed to result in better impregnation of the mat and the yarns of the fabric and in better resultant properties.

Such a uniform film 5 provides the features of very little or no wicking and very high resistance to hydrostatic pressure.

The following Examples are illustrative of the invention.

EXAMPLE I

A reinforced film impervious to water and being essentially void free with little or no wicking is prepared as follows:

A warp inserted weft knit polyester scrim, weighing three to three and one half ounces per square yard, made from 1000 denier continuous filament polyester and having 9×12 yarns per inch, is fed through a PVC plastisol bath of viscosity 2500 cps at a depth of two to three inches. The plastisol bath contains 85% solids (organosol to plastisol). The coated scrim is fed separately or jointly with a polyester mat that weighs one half ounce per square yard through nip rollers approximately twelve inches in diameter. The nip rollers squeeze the fabric such that the remaining liquid from the coating bath fills the majority of windows in the fabric. The DPU is 170–220%.

The fabric is then fed across can dryers or rollers at a temperature of about 290° F. to dry and set the impregnated combination. The air permeability at this point is 100 to 500 (cubic feet) (seconds) per square foot. Little or no carriage liquid remains after this stage.

The combination is then fed to two 30 inch diameter nip rollers (one rubber, one steel). The steel roller is heated to approximately 400° F. The nip rollers apply pressure at approximately 150 to 200 pounds per linear inch such that the plastic flows to further impregnate the yarns, to penetrate the mat and to fill all voids, interstices and pores. The rubber roller is crowned at the center to provide uniform pressure across the width of the roller even at the pressure used. The plastic is cured by the heat. The resulting reinforced, unitary film is non-porous, water impermeable, and low-wicking.

EXAMPLE II

A reinforced film impervious to water and being essentially void free with little or no wicking is prepared as follows:

A warp inserted weft knit polyester scrim, weighing three to three and one half ounces per square yard, made from 1000 denier continuous filament polyester and having 9×12 yarns per inch, is fed through a PVC plastisol bath of viscosity 2500 cps at a depth of two to three inches. The plastisol bath contains 85% solids (organosol to plastisol). The coated scrim is fed separately or jointly with a paper mat that weighs on the order of one half ounce per square yard through nip rollers approximately twelve inches in diameter. The nip rollers squeeze the fabric such that the remaining liquid from the coating bath fills the majority of windows in the fabric. The DPU is 170–220%.

The fabric is then fed across can dryers or rollers at a temperature of about 250° F. to 290° F. to dry and set the impregnated combination. The air permeability at this point is 10 to 100 (cubic feet) (seconds) per square foot. Little or no carrier liquid remains after this stage.

The combination is then fed to two 30 inch diameter nip rollers (one rubber, one steel). The steel roller is heated to approximately 400° F. The nip rollers apply pressure at approximately 150 to 200 pounds per linear inch such that the plastic flows to further impregnate the yarns, to penetrate the mat and to fill all voids, interstices and pores. The rubber roller is crowned at the center to provide uniform pressure across the width of the roller even at the pressure used. The plastic is cured by the heat. The resulting reinforced, unitary film is non-porous, water impermeable, and low-wicking.

Figure 3:
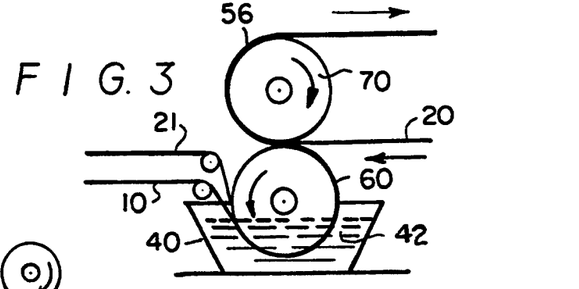
FIG. 3 is a partial view of another embodiment of apparatus for use in applying the manufacturing method of this invention.

FIG. 3 is a partial view of another embodiment of the apparatus for use in applying the manufacturing method for this invention. Like reference numerals have been used for like elements as in the FIG. 2 embodiment and further discussion will be made only as necessary to explain the features of the embodiment of FIG. 3.

In this embodiment, a WIWK fabric 10 is fed along with a mat 21 on feed roller 60 into liquid coating bath 42 held in container 40. The mat 21 has substantially the same properties as mat 20 discussed with reference to the FIG. 2 embodiment. Optionally, the mat 20 is then introduced to the fabric 10 and the mat 21 combination leaving the liquid coating bath 42. Thus, the mat 20 is fed to the side opposite mat 21, with fabric 10 in between. These three layers are then fed between feed roller 60 and nip roller 70. The resulting combination 56 from this stage is then fed to the setting stage and calendering stage as in the embodiment of FIG. 2.

Although it has been shown that mat 21 and mat 20 are both introduced along with fabric 10 at the liquid application stage 42, the present invention is not limited to this preferred embodiment. In fact, either one of the mats 20 and 21 may individually be fed adjacent to the fabric 10 at this stage. In addition, more than two mats could be introduced at this stage, as well. As many mats as are desired in the resulting fabric may be introduced at this stage by applying the novel concepts of the instant invention.

Figure 4:
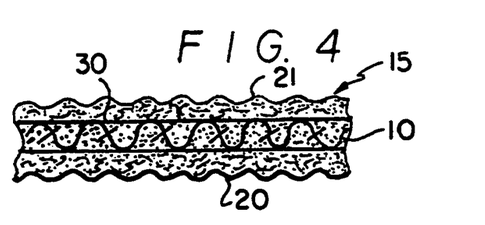
FIG. 4 is a cross-sectional view of an impervious, unitary film according to another embodiment of the present invention.

FIG. 4 shows a resulting impervious film 15 according to the embodiment shown in FIG. 3. As will be discussed later, FIG. 4 shows a resulting impervious film 15 according to the embodiment shown in FIG. 5, as well.

The resulting fabric 15 includes an open fabric 10, mat 20 and mat 21. This fabric and these mats may have similar properties as those discussed with respect to the embodiment of FIG. 1. Accordingly, further comment with respect to the properties thereof will not be made and reference may be had to the earlier discussion. The mats 20 and 21 bridge the gap between the yarns of the fabric 10 and hold enough applied thermoformable plastic 30 such that after calendering, the coating is forced throughout the mat and the yarns of the fabric and no pinholes remain in the final product.

The resulting reinforced film 15 is one having all interstices filled, the surfaces of which are smooth, with no voids or air bubbles existing. The resulting film 15 is water impervious, strong, non-porous and has the feature of having a high resistance to hydrostatic pressure.

Figure 5:
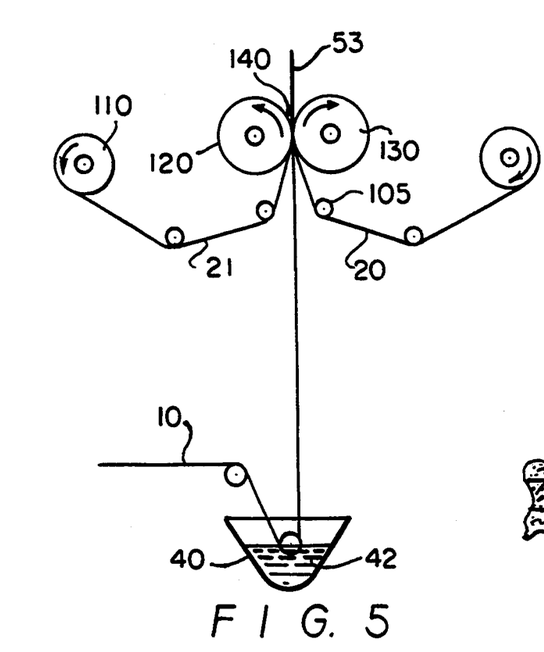
FIG. 5 is yet another embodiment of apparatus for use in applying the manufacturing method of this invention.

FIG. 5 shows yet another embodiment of apparatus for use in applying the manufacturing method of the instant invention. Like reference numerals have been used for like elements as in previous embodiments and further discussion will be made only as necessary for explanation of the instant embodiment.

Fabric 10 is fed to the liquid bath 42 held in container 40. From the bath, the fabric is fed towards nip stage 140 that includes nip rollers 120 and 130. At this stage mats 20 and 21 are fed from suitable feed rollers 110 along guide rollers 105 towards nip rollers 120 and 130. The combination 53 is then led to later stages where it is set and calendered, typically at elevated temperatures, as discussed earlier.

As discussed with respect to the previous embodiment of FIG. 3, it is within the concepts of the instant invention to feed either of the mats 20 and 21 individually adjacent to the web 10 at the stage 140. In addition, more than the number of mats shown could be fed, as well.

By utilizing the novel features of the instant invention as shown in FIG. 5, the resulting film 15 as shown in FIG. 4 may be attained. Film 15 includes mats 20 and 21 on either side of fabric 10, with suitable plastic coating 30 permeating-the layers. The resulting reinforced film 15 is one having all interstices filled and smooth surfaces, with essentially no voids or air bubbles. The resulting film 15 is also water impervious, strong, non-porous and has the feature of having a high hydrostatic pressure resistance and being resistant to water absorption, i.e., it is "low-wicking".

As indicated above, the processes discussed are merely representative of processes which could be used to create various fabrics in accordance with the instant invention. It is to be understood that not only the fabrics, but also the processes which have been disclosed, are illustrative only. Therefore, the foregoing detailed description and examples are not limiting as to the scope of the present invention. Modifications and variations are contemplated within the scope of the present invention, which is intended to be limited only by the scope of the accompanying claims.

What is claimed is:

1. A continuous process for manufacturing a non-porous, reinforced, impervious, unitary film, said process comprising the steps of:

providing a low viscosity impregnating liquid comprising a thermoformable plastic having a sufficiently high percentage of solids to liquids so that a non-porous unitary film is capable of being formed upon calendering;

providing an open fabric having a plurality of yarns in a first direction and a plurality of yarns in a second direction;

providing at least one lightweight, porous, organic, cellulosic mat comprising a plurality of filaments;

continuously feeding the fabric and the mat from respective feed ends to an exit end;

impregnating the fabric and the mat with the impregnating liquid, the impregnating liquid flowing into the open fabric and the porous mat to impregnate the yarns of the fabric and to surround the filaments of the mat and to form a side by side impregnated combination of fabric and mat in which the weight of the thermoformable plastic carried on the impregnated combination is 100 to 800% measured as dry pick-up weight relative to the combined weight of the fabric and the mat, which amount is sufficient to be deformed into a non-porous unitary film upon calendering, the mat bridging gaps between the yarns of the fabric;

continuously setting the plastic of the impregnated combination of fabric and mat to eliminate essentially all carrier liquid and to form an impregnated combination of fabric, mat, and set plastic, the set, impregnated combination having gaps between the yarns of the fabric bridged by mat impregnated with set plastic and having a predetermined porosity; and continuously deforming the set, impregnated combination of plastic, fabric, and mat by calendering with a heated calender roll of sufficient heat and at a sufficient pressure gradient to deform the plastic to further impregnate and surround the yarns of the fabric and filaments of the mat with the plastic and to close essentially all remaining pores and voids in the impregnated combination, to create a non-porous, impervious, continuous, low-wicking, essentially void-free, unitary film having a reinforcement of fabric and mat embedded therein.

2. The process of claim 1 in which the liquid is PVC plastisol.

3. The process of claim 1 in which the viscosity of the liquid is between 50 and 10000 cps.

4. The process of claim 1 in which the open fabric is a weft inserted warp knit fabric.

5. The process of claim 4 in which the fabric has four to twenty yarns per inch.

6. The process of claim 1 in which the fabric has a weight of one to eight ounces per square yard.

7. The process of claim 1 in which the mat weighs 0.3 to 1.0 ounces per square yard.

8. The process of claim 1 in which the impregnated combination, after setting of the plastic, has an air-permeability of between 10 to 400 (cubic feet)(seconds) per square foot.

9. The process of claim 1 wherein the deforming by calendering step comprises calendering by applying pressure of about 50 to 300 pounds per linear inch.

10. The process of claim 1 wherein the deforming by calendering step comprises heating the calender roll to a temperature in the range of 250° to 450° F.

11. The process of claim 1 in which the open fabric is biaxial.

12. The process of claim 1 in which the film is prepared by wet lamination of the open fabric to the mat.

13. The process of claim 1 in which the resulting film is essentially non-wicking.

14. The process of claim 1 wherein the deforming by calendering step comprises heating the calender roll to a temperature in the range of 325° F. to 410° F.

15. The process of claim 1 wherein the set, impregnated combination resulting from said setting step has a low porosity.

16. The process of claim 1 wherein the set, impregnated combination resulting from said setting step is non-porous.

17. The process of claim 1 wherein the impregnating liquid contains approximately 85% solids to carrier liquid.

18. The process of claim 1 in which the dry pick-up weight of the thermoformable plastic carried on the impregnated combination is 100 to 500% of the combination.

19. The process of claim 18 in Which the dry pick-up weight of the thermoformable plastic carried on the impregnated combination is 120 to 280% of the combination.

20. The process of claim 18 in which the viscosity of the liquid is between 1000 and 4000 cps.

21. The process of claim 3 in which the viscosity of the liquid is between 1000 and 4000 cps, 22. The process of claim 21 in which the viscosity of the liquid is between 2000 and 3000 cps.

23. The process of claim 5 in which the fabric has a weight of one to eight ounces per square yard, and the mat is a bonded mat of filaments of 0.2 to 1.5 ounces per yard.

24. The process of claim 23 in which the viscosity of the liquid is between 1000 and 4000 cps.

25. The process of claim 23 in which the pressure applied in the calendering step is about 150 to 200 pounds per linear inch.

26. The process of claim 23 in which the dry pick-up weight of the thermoformable plastic carried on the impregnated combination is 100 to 500% of the combination.

27. The process of claim 26 in which the dry pick-up weight of the thermoformable plastic carried on the impregnated combination is 120 to 280% of the combination.

28. The process of claim 23 in which the impregnated combination, after setting of the plastic, has an air permeability of between about 0 to 300, the viscosity of the liquid is between 2000 and 3000 cps, the pressure applied in the calendering step is about 150 to 200 pounds per linear inch, and the dry pick-up weight of thermoformable plastic carried on the impregnated combination is 100 to 500% of the combination.

29. The process of claim 28 in which the dry pick-up weight of the thermoformable plastic carried on the impregnated combination is 120 to 280% of the combination.

30. The process of claim 8 in which the air permeability of the impregnated combination, after setting of the plastic, is about 0 to 300.

31. The process of claim 9 in which the applied pressure is about 150 to 200 pounds per linear inch.

32. The process of claim 1 in which the organic, cellulosic mat is selected from the group consisting of paper, tissue paper and cellulose fiber.

33. The process of claim 32 in which the organic mat further comprises at least one material selected from the group consisting of polyamide, polyolefin, glass, fiberglass, rayon and polyester.

34. An impervious, reinforced, unitary film comprising:
an open fabric comprising yarns;
at least one lightweight porous mat comprising cellulosic fibers; and
a thermoformable plastic impregnating the fabric and the mat;
the thermoformable plastic impregnating the fabric and mat having been set in situ to eliminate essentially all carrier liquid and, after setting, the plastic, fabric and mat having been calendered under heating conditions such that yarns of the fabric and filaments of the mat are impregnated with the plastic and adhere to the plastic, and the combination of plastic, fabric and mat forms an impervious, reinforced, unitary film.

35. The film of claim 34 in which the film is essentially non-wicking.

36. The film of claim 34 in which the weight of the plastic is 100 to 800% the weight of the fabric and the mat.

37. The film according to claim 34 wherein the open fabric weighs from one to eight ounces per square yard.

38. The film according to claim 34 wherein the lightweight porous mat weighs from 0.2 to 1.5 ounces per square yard.

39. The film according to claim 34 wherein the fabric weighs from six to fifty ounces per square yard.

40. The film of claim 34 having a hydrostatic resistance greater than 200 psi.

41. The film of claim 34 in which the mat is made from one of paper and tissue paper.

42. The film of claim 34 in which the mat is also made from a material selected from the group consisting of polyamide, polyolefin, glass, fiberglass, rayon and polyester.

43. The film of claim 34 in which the mat also comprises at least one material selected from the group consisting of paper, tissue paper, polyamide, polyolefin, glass, fiberglass, rayon and polyester.

* * * * *

UNITED STATES PATENT AND TRADEMARK OFFICE
CERTIFICATE OF CORRECTION

PATENT NO. : 5,399,419
DATED : March 21, 1995
INVENTOR(S) : JOHN F. PORTER, ET AL.

Page 1 of 2

It is certified that error appears in the above-indentified patent and that said Letters Patent is hereby corrected as shown below:

COLUMN 1

Line 6, "Jul. 7, 1991," should read --Jul. 25, 1991,--.

COLUMN 3

Line 2, "abovede-" should read --above-de--; and

Line 5, "that" should be deleted.

COLUMN 4

Line 43, "filaments preferably," should read --filaments, preferably--.

COLUMN 5

Line 17, "non woven" should read --non-woven--.

UNITED STATES PATENT AND TRADEMARK OFFICE
CERTIFICATE OF CORRECTION

PATENT NO. : 5,399,419
DATED : March 21, 1995
INVENTOR(S) : JOHN F. PORTER, ET AL.

It is certified that error appears in the above-indentified patent and that said Letters Patent is hereby corrected as shown below:

COLUMN 6

Line 8, "order to" should read --order of--; and

Line 66, "incides" should read --indices--.

COLUMN 11

Line 53, "Which" should read --which--.

Signed and Sealed this

Fifth Day of September, 1995

Attest:

BRUCE LEHMAN

Attesting Officer

Commissioner of Patents and Trademarks